(12) United States Patent
Kodesh et al.

(10) Patent No.: US 8,538,093 B2
(45) Date of Patent: Sep. 17, 2013

(54) METHOD AND APPARATUS FOR ENCOURAGING SOCIAL NETWORKING THROUGH EMPLOYMENT OF FACIAL FEATURE COMPARISON AND MATCHING

(76) Inventors: Mark Kodesh, San Diego, CA (US); Jodi Kodesh, San Diego, CA (US)

( * ) Notice: Subject to any disclaimer, the term of this patent is extended or adjusted under 35 U.S.C. 154(b) by 491 days.

(21) Appl. No.: 12/764,087

(22) Filed: Apr. 20, 2010

(65) Prior Publication Data
US 2010/0266167 A1 Oct. 21, 2010

Related U.S. Application Data

(60) Provisional application No. 61/170,977, filed on Apr. 20, 2009.

(51) Int. Cl.
*G06K 9/00* (2006.01)

(52) U.S. Cl.
USPC .......................................................... 382/118

(58) Field of Classification Search
USPC .................................. 382/118, 209, 218, 305
See application file for complete search history.

(56) References Cited

U.S. PATENT DOCUMENTS

| | | | |
|---|---|---|---|
| 3,805,238 A | 4/1974 | Rothfjell | |
| 4,712,103 A | 12/1987 | Gotanda | |
| 4,858,000 A | 8/1989 | Lu | |
| 4,975,969 A | 12/1990 | Tal | |
| 5,031,228 A | 7/1991 | Lu | |
| 5,053,603 A | 10/1991 | Wagner et al. | |
| 5,164,992 A | 11/1992 | Turk | |
| 5,386,103 A | 1/1995 | DeBan | |
| 5,432,864 A | 7/1995 | Lu et al. | |
| 7,587,070 B2* | 9/2009 | Myers et al. | 382/118 |
| 8,204,280 B2* | 6/2012 | Kluesing et al. | 382/118 |
| 2005/0185060 A1 | 8/2005 | Neven | |
| 2006/0018522 A1* | 1/2006 | Sunzeri et al. | 382/118 |
| 2006/0050933 A1 | 3/2006 | Adam et al. | |
| 2008/0201327 A1* | 8/2008 | Seth | 707/5 |
| 2008/0270425 A1* | 10/2008 | Cotgreave | 707/100 |
| 2011/0209192 A1* | 8/2011 | Leclerc Greer et al. | 726/1 |

\* cited by examiner

*Primary Examiner* — Daniel Mariam
(74) *Attorney, Agent, or Firm* — Donn K. Harms

(57) ABSTRACT

A social networking site providing facial similarity matching services to subscribers to the social networking site. A subscriber may upload a digital image of himself and have it compared to digital images of other member subscribers using software to interpret points of comparison on each digital image. Subscribers may effect the outcome of the matching process by designating a selection of images as close matches from a computer generated plurality of matching images. A collage of finally matched images is provided to the inquiring subscriber as well as contact information to communicate with the other subscribers.

20 Claims, 1 Drawing Sheet

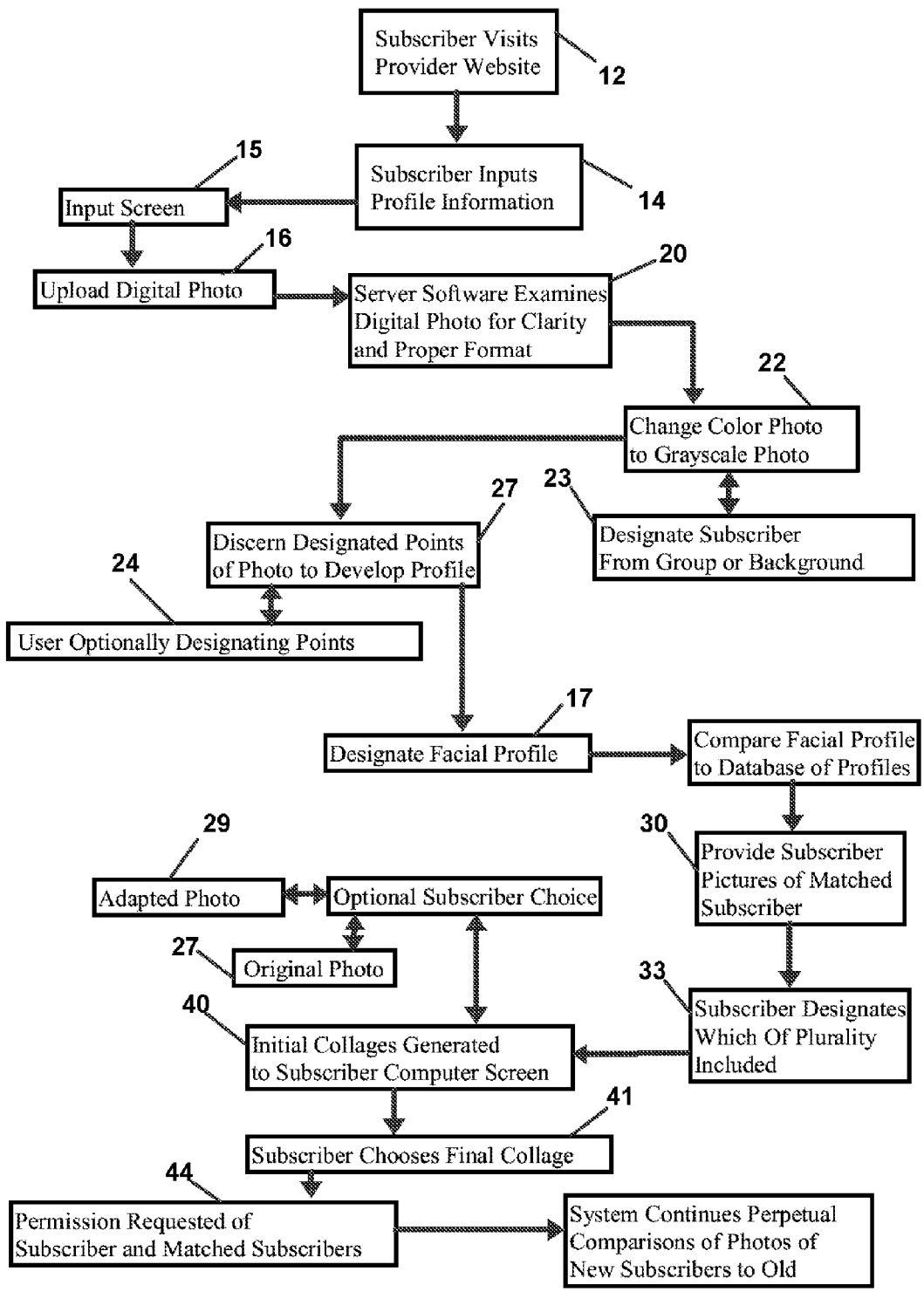

METHOD AND APPARATUS FOR ENCOURAGING SOCIAL NETWORKING THROUGH EMPLOYMENT OF FACIAL FEATURE COMPARISON AND MATCHING

This application claims the benefit of Provisional Patent Application No. 61/170,977 filed on Apr. 20, 2009, and is incorporated herein in its entirety.

FIELD OF INVENTION

The present invention relates generally to social networking amongst individuals having a similarity in appearance but who are not related. More particularly, the disclosed method and apparatus relates to an online service which allows subscribing users in a social network to input facial photos of themselves for comparison with other subscribers appearances for similarity. The inquiring subscriber is then presented with one or a plurality of people and/or profiles of person's having a similar facial appearance.

BACKGROUND OF THE INVENTION

For ages, people have been fascinated with the possibility they may have a twin or double existing somewhere in the world population. With the advent of photography and more modernly, digital photography, the interest in the concept of having a double has only increased due to the sheer number of available photographs of people in publications and on the internet.

In previous decades, it would take many hours to physically search photos of people and compare them to the characteristics in a photo or photos of a person wanting to seek a possible twin or double. However, with the advent of digitized photography and facial recognition and associated software and algorithms, facial recognition has become a science which employs the vast power of data processing to identify one face among millions.

A prime reason for the employment of such digital facial recognition software and digital photography in the past has been law enforcement and security. Las Vegas casinos use a plethora of cameras on their property to communicate pictures of patrons to computers and software to try and continually ascertain if people entering a casino are on a known list of undesirables. Most other facial recognition uses are also for security purposes and employ a digital facial photo to the characteristics of millions of file photographs of individuals which are in a relational database. Each stored photo is associated with the person's history and identity. A match of a captured photo of a person with a file photo and associated profile of that person essentially is done to ascertain if they are a security threat.

Consequently, digital photo recognition used to match captured or submitted photos has not been substantially employed in the task of ascertaining if a person resembles someone else who has their digital image stored in the database of a social networking site. While such a task would help individuals answer the age old question "do I have a double or twin" it also has commercial potential in identifying body doubles for actors or finding persons with a facial structure to match, for instance, an advertiser's needs for a certain product.

Such a service would be especially fun and interesting for modern social networking where online subscribers regularly search for other members who have commonality. People may subscribe to a social networking provider offering the service of matching their facial photo to others to find people with similar appearances. Thereafter, they may actually communicate with each other. Another possibility of use might be a premium service offered to subscribers which would interface with an opt-in database of photos of members of other existing social networking services such as Facebook or MySpace.

Social networking, using the internet, is arguably one of the biggest successes of the internet over the past five years. Wildly popular networking sites such as MySpace, Facebook and YouTube have risen to provide members world wide exposure for themselves to potential friends, dates, spouses and unfortunately, predators and unseemly individuals. Most such social networking sites offer subscribers the ability to upload their personal photos for display or to store in their profile. Consequently, millions of user's photos are currently stored on servers throughout the world. With the use of an opt-in or premium content subscription, photos of interested third party members can be easily compared to each other and to other social networking sites through a central provider. In this fashion security may be maintained for even the opt-in users as to whether they wish to be contacted by a purported facial match on their own or another social networking site. This ability for users of the service herein or other social networking sites working with a provider of the service herein to ascertain matches in appearance, surely would be of great interest to users and would encourage more social networking.

However, the major focus of most facial recognition software used today is enhancing security and matching real time captured images to images and related files within a database to ascertain if a match exists based on non-user criteria so as to simply identify the person in the captured image. While few providers have established methods for finding twins, no provider has undertaken the unique and very different task of providing a social network which provides a comparison of an inquiring subscriber's provided photograph, immediately and/or continually, to a database of photos stored in memory of other subscribing members of the social network to find individuals in the network with similar facial appearances. Further, allowing the subscriber to input their view of the subjective possible matches and allowing interaction between matched individuals on the social network has yet to be done.

A number of recent software applications and commercial firms have started to employ facial matching for purposes other than security. For instance, U.S. Pat. No. 7,450,740, (Shah et al) discloses a method and system for providing the general public who visit their site a means for determining which celebrity they may look like. However, no provision for the inquiring party to effect the outcome of the search is given nor any ongoing social networking and communication between individuals identified in the outcome of the subscriber requested search.

Visionics, a company based in New Jersey provides the FACEIT facial recognition system using an algorithm in a mathematical technique to encode a proprietary database of faces. The system maps the face and creates a faceprint. Once the system has stored a faceprint, it can compare it to thousands or millions of faceprints stored in a database. This system, however, does not combine the service with a social networking system nor does it allow subscriber input to effect the outcome.

U.S. Pat. No. 3,805,238, (Rothfjell) teaches a Method For Identifying Individuals Using Selected Characteristics of Their Body Curves. Rothfjell teaches an identification system in which major features (e.g. the shape of a person's nose in profile) are extracted from an image and stored. For an ID match of that same person, the stored features are subsequently retrieved and overlaid on a current image of the person to verify identity. Rothfjell, however, seeks to identify the same person and to eliminate other persons who might match and to that end provides no means for social networking nor subscriber input as to the outcome.

An additional teaching is found in U.S. Pat. No. 4,712,103 (Gotanda) which employs a type of facial recognition for a Door Lock Control System. Gotanda teaches storing a provided digitized facial image in a non-volatile memory as a key to allow a person access to a secured area if their current picture matches the stored image. However, Gotanda is simply concerned with matching a single individual's images and is not concerned with ascertaining others who might appear similar or in allowing subscriber input to effect the outcome.

Another facial recognition method is taught in U.S. Pat. No. 4,858,000(Lu). Lu teaches an image recognition system and method for identifying a single individual from a predetermined set of individuals, each of whom has a digital representation of his or her face stored in a defined memory space. Lu does not, however, provide any social networking amongst similarly appearing members nor any means for the subscriber to initially impact the outcome of the search.

Another patent by Tal, U.S. Pat. No. 4,975,969 teaches an image recognition system and method which employs ratios of facial parameters such as distances between definable points on facial features such as a nose, mouth, or eyebrow. These are measured from a facial image and are used to characterize the individual rendered to identify them subsequently. However, no social networking and ongoing interaction is provided nor any means for the subscriber to impact the outcome.

Another patent by Lu, U.S. Pat. No. 5,031,228, teaches an image recognition system and method for identifying a single individual from a predetermined set of individuals. A library of all the individuals is also kept. Lu in this instance is still concerned with identifying individuals and eliminating other individuals who might have a very close appearance. No social networking or input of the inquiring subscriber to effect the outcome is provided either.

Yet anther prior art reference is U.S. Pat. No. 5,053,603 (Burt). Burt teaches an image recognition system using differences in facial features to eliminate like-appearing individuals and distinguish one individual from another. Burt is, however, concerned with eliminating other individuals who might have a similar appearance and offers no social networking of like-appearing individuals since Burt seeks to eliminate them.

Another facial recognition patent, U.S. Pat. No. 5,164,992, (Turk), a method for recognizing and identifying members of a television viewing audience is taught. The Turk system is designed to observe a group of people and identify individual persons in the group from prior photos. Thereafter, they are identified to incorporate their individual demographics in television ratings determinations. Turk lacks any provision for ascertaining similarly appearing individuals nor any ongoing social networking of subscribers or for allowing the inquiring subscriber to effect the outcome.

Still another is U.S. Pat. No. 5,386,103 (Deban) which teaches the use of a methodology for encoding a reference face of a person and storing that reference face on a card or the like. The reference face is then used to identify the same individual at a point of entry from a new photo at that locale. Like the other art, Deban teaches against the employment of software and steps to find close matches in multiple individuals' appearance and socially networking them as subscribers.

An additional patent by Lu, U.S. Pat. No. 5,432,864 teaches the use of a methodology for encoding a human facial image and storing it on a portable memory device for later retrieval or automatic verification of the same individual at a different time or place. However, provisions for social networking are not provided. Provisions for ascertaining individuals with a similar appearance to a subscriber of a networking service or for allowing the subscriber to input and effect the outcome.

U.S. Patent Publication 2005/0185060 (Neven) teaches a means to inquire about an image using Mobile Telephones With an Integrated Camera. Neven discloses a system using a mobile telephone digital camera to send an image to a server which then converts the image into symbolic information. Thereafter, the system links associated with the server-identified image which are provided by search engines. However, Neven does not teach any system to find similarly appearing individuals on a social networking system or a system which allows subscribers to the system to input and effect the outcome of such a search.

Another patent teaching facial recognition is Adam et al., U.S. Patent Publication 2006/0050933. Adam, however, is for a Single Image Based Multi-Biometric System And Method which integrates face, skin and iris recognition to provide a biometric system to later identify only the same individual when queried.

Accordingly, there exists an unmet need for a device and method which enables subscribers to a social networking provider to ascertain if there are any other persons, in their social network or on an associated social network, who might look like them or actually be their twin. Such a system should endeavor to find the most high quality matches of other individuals within the social network and provide the inquiring subscriber with a set of matches. Such a system should endeavor to allow the inquiring subscriber to provide input leading to the outcome of the search through their personal viewing of the initial match results and input as to those the subscriber finds closest. Such a system should endeavor to find individuals with very similar appearances and eliminate factors such as hair color, background color and photo elements which might effect the outcome also. Such a system should employ networking and database and software to allow the widest distribution of the service so that inquiring subscribers to the social network may have their photos compared to the largest possible collection of other facial images. Such a method should employ networking criteria to allow inquires to come directly from subscribers or from subscribers to other social networking sites as an opt-in, upgrade or extra service to thereby increase the pool of images in the social networking database over time. Such a system should provide a collage of ascertained facial matches for the subscriber to post on their home page for others to view and include a linking ability for the collage if posted on other sites. Finally, such a service should also provide sufficient security measures to insure that an inquiring subscriber to the social network is seeking their own double and not that of another and should only provide contact and identity information to parties finding a match if approved by all parties involved.

With respect to the above, before explaining at least one preferred embodiment of the system for facial matching of an individual to all others in a database in detail, it is to be understood that the invention is not limited in its application to the details of construction and to the arrangement of the components or steps set forth in the following description or illustrated in the drawings. The various apparatus and methods of the invention are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other devices, software and methods and systems for carrying out the several purposes of the present disclosed device and method enabling subscribers to find other individuals with similar or virtually identical facial appearances to their own. It is important, therefore, that the objects and claims be regarded as including such equivalent construction and methodology insofar as they do not depart from the spirit and scope of the present invention.

SUMMARY OF THE INVENTION

The present invention is directed to a networked system for social networking amongst subscribing individuals which provides for inputting digital facial photographs of those subscribers and authorized users which is employed to ascertain if others in the social network, or a related social network, have a similar physical appearance. In doing so, a database of provided images from the social networking subscribers is assembled and matches are ascertained by comparing subscriber-provided images to look for similarities between other subscribers to the social networking site who have a similar appearance. Rather than eliminating others and identifying a single individual as security oriented systems do, the disclosed system herein seeks to find a plurality of other social network subscribers who have physical characteristics making them look like the inquiring subscriber. In a preferred mode of operation, the social networking system herein, operates with a captive database of digitized images of subscribers. However, it can operate to search a database of an associated social networking site to seek similarly appearing individuals using links or ties to the other social networking web sites who have members that opt-in to the database being searched. In the preferred mode at present, as a stand alone social networking website and server, the system may operate under a domain name such as Twinish.com. As a stand-alone subscriber service, subscribers will enjoy a social networking website where all fellow members may communicate over the internet. Such a service would be created for the purpose of such communication and entertainment and for identifying other members in the social network who have a facial appearance similar to an inquiring subscriber. The search for individuals of like-appearance may be expanded to members of other social networking sites where photos are stored digitally through an opt-in type sign up of those members of other sites.

Subscribers to the social networking site herein will provide profile information related to themselves including their digital image and various possible types of personal information such as their name, birth date or password on screens prompting them to do so. Once their profile is input, the subscriber may then be provided with a screen where they are able to upload the digital photo of themselves of their choosing. On the photo input screen, users are provided tips as to the best way to pick the right picture that best represents the user's facial features. This is done to establish some commonality among photos for the subsequent reviewing using software.

The subscribing user may at this point be given the option to designate various points on their photo by placing the cursor thereon and depressing a key. This may be done for instance at the center of each eye, the tip of the nose, on the eyebrows, chin and other points on the face which the software running on the computer employs to define a facial profile for the user. This facial profile is employed to match the user to other subscribers with such facial profiles stored in memory. Point designation is preferred should the photo provided be blurry or lack detail or in some cases to augment the software scanning of the photo in establishing the points on the face for the facial profile.

Point designation or person designation may also be requested of the user if they upload a photo with multiple faces thereon. If such is ascertained by the software, the user is requested to at least designate themself in the photo and may also be asked to input targeted spots noted above on their fact that are used to develop the facial profile.

Research by the applicant has found that looking face-forward, with little facial expression, directly into the camera is the best way for subsequently employed facial recognition software to find a direct match. Examples of correctly formatted photos of both males and females may also be provided to the users. Also, on the photo input screen may be an example of the collage that is being created for the user.

Subsequent to uploading their images, users are directed to a "Please be patient while your photo is scanned" screen that will display a face showing them how the facial recognition software is working on scanning their facial features into the database. The user is shown a color rendition of the photo. However, experimentation has shown that in many instances, the system performs facial matches more accurately when the photo is changed to gray scale from color for the comparison by the software running on the computer. Consequently, in a preferred mode of the system herein, the software employed for facial matching and comparison will first change any color digital photo to a grayscale photo and then perform the comparison.

After that process is finished, users may be directed to another screen which displays the user's original photo and a second photo that will display their face in a cropped fashion to show what the facial recognition software detected. Optionally but preferred, at this point the user has a first chance to effect the outcome by using their option to choose their original photo to be used in the collage or the new cropped photo displaying only their face. Since the user has been looking in mirrors for years and knows their own face, it is felt that allowing the user to input changes to the photo to be examined to best show their true appearance is a step that provides matches later on which will be closer to the appearance of the user.

Also optional but preferred, the user has a second chance to input and effect the outcome of the search. This is provided when the system displays a plurality of other images of other members, such as five, of the best matches found through the service's database. An expanding database of subscribers and associated subscribers to social networking sites will yield the best and largest amount of matches since the more registered users in the database comparing images, the closer the matches will be.

In this optional but preferred step, out of the plurality of matches displayed to the user, the user has the ability to choose the top faces that they feel are their best matches by placing a check mark near the person's profile/picture. This step is preferred since who users may think looks like them can sometimes be subjective. The computer will pick out the best matches, but the user's eye is the one that makes the ultimate decision. This choice of similarity can have a large effect during subsequent searches as the software can save the attributes of the images the user felt were closest and apply those attributes in seeking matches in subsequent searches.

During the display for subscriber input on similarity to their own, under each picture presented to a user, it may show the percentage of how the software thought each person matched the original user and what state/city they live in. After the user chooses their matches from the first plurality presented, the list is pared of any photos the subscriber feels were not similar. At this point the subscriber may be given an input command to execute a "create collage" function.

At this point, another page appears on the user's display which is transmitted from the server, and shows a plurality of collages, all of which display the original subscribing user along with the faces/profiles of other subscribers they selected as their look-alikes in the previous page. Three such collages is a current favorite provision as it has been found to give the subscribing member enough choices to make a difference in appearances but not so many as to make the choice impossibly hard. The subscribing user may choose one of the collages and its decorative designs. Each of the three collage templates presented to the subscribing user contains the same faces/profiles of the other subscribers they selected in the previous screen as their best matches. However, each template is a little bit different from the other giving the user a little bit of variety in their choice of the collage which will be posted to their home page on the social network and may be employed as a hot link to their social network home page on other sites such as Facebook or MySpace.

When this collage is created, a stamp of the Twinish.com logo is positioned in the upper right hand corner or somewhere else that is readable. This file can then be saved to the user's computer, or it can be directly uploaded to their MySpace, Facebook, Twinish, etc. social network accounts to show their matches to others and to allow a link to their homepage on their social networking site.

Once registered and matched, subscribers to the social networking site herein will find that their providing website becomes much more interactive and keeps them wanting to return. The provider for the social networking site will provide users the ability for social interaction between the user, other friends who are subscribers, and with the people from the photos which they choose as their look-alikes. This interaction is best done by requiring consent by all parties.

After the collage has been created and their identification information stored, the user will be able to add more information to their personal profile. In their profile they may fill out as much or as little information as they choose. They can also add more pictures to their profile, but there can only be one picture that essentially is their "collage" picture that was used for the facial recognition.

At this point in the system, a permission stage occurs and the user can make a choice of whether or not they would like to interact with the other look-alikes. They can email their look-alikes, post a comment on their wall, or view any information they have posted on their profile.

The "look-alike" portion of the facial recognition can operate for security purposes, as the pass-key to be able to talk with one another (if their matches don't come up when the software is run, then the user can't talk with them or add them to their profile). If they would like to add their friends and family to interacting parties, the users can do so by simply searching for them, then sending an add request (unlike the "look-alike" pass-key portion where they are added automatically).

Also provided in the preferred mode of the system is a "what are you doing right now?" status bar which can be filled out at any time located in the center of the page to post up to the minute comments just like Facebook or Twitter.

The system operates to achieve matches on an ongoing basis since every second of everyday new faces are being added to the database. This allows the previously registered subscribers and ongoing users to get an update of possibly newer and better matches. This ongoing search can be greatly effected by the subscribers input as to what are the closest matches to themselves by using the facial attributes of the photos the subscribing user chose subjective as similar. The subsequent searches can occur subsequent to the user's collage being formed, when other users join and the software ascertains a new match of the user to a new subscriber. When that occurs, the user who has been a member will receive an email stating a new member has registered and a match occurred with a message such as "Someone that looks like you has just registered on www.twinish.com!" Of course the subsequent subscribing user's input when asked as to closest results will effect the match to earlier and subsequent users.

Where the subscriber is identified as similar to another subscriber from their search, the subscriber will be notified and will be offered a click through to the link to see how close of a match has occurred. After the previous subscribing user views the new face match to the new member, they can then decide whether or not the would like to add the new match to their own profile/collage page. If the prior registered user decides to add them, then, based on the percentages of match, the new match would be moved up or down on the prior user's profile page (in numeric order, based on the highest to lowest percentage). However, the original 3 people that were selected when the user created the profile will also be kept.

By continually searching for, and adding new matches, and employing the input by subscribing users as to characteristics they consider matching in the first group of photos provided in a search, the results more closely resemble the subscribing user. As new subscribers are added, or if large social networking sites like FACEBOOK allows their members to provide photos for use and comparison, the providing server and site grows exponentially in a process that is perpetual.

The foregoing has outlined, rather broadly, the more pertinent and important features of the facial comparison and matching method and system herein, in order that the detailed description of the invention that follows may be better understood so that the present contribution to the art may be more fully appreciated. It should be appreciated by those skilled in the art, that the conception and the disclosed specific embodiments herein, may of course be readily utilized as a basis for providing other facial matching services for subscribers and authorized users for carrying out the same purposes of the present invention. It should also be realized by those skilled in the art that such equivalent systems and methods are considered within the spirit and scope of the invention as set forth herein.

THE OBJECTS OF THE INVENTION

It is therefore an object of the present invention to provide an easily accessible social networking site which allows user subscribers to input their image digitally and have it compared to millions of stored images of other subscribers to the social network who are looking for a match to provide a plurality of such matches.

It is an additional object of this invention to provide such a system of individual appearance-matching that may be employed as an opt-in service in conjunction with other social networking systems already in existence.

A further object of the facial matching social networking system herein is the provision of a user input option as to facial similarity ascertained by the software so as to improve ultimate results.

An additional object of the invention is for software adapted to the task, running on the provider server, to generate a collage of fellow social networkers and the subscribing user, for posting on the user's homepage or another user page.

While all of the fundamental characteristics and features of the disclosed facial matching software and deployment have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth.

It should be understood that such substitutions, modifications, and variations may be made by those skilled in the art without departing from the spirit or scope of the invention. Consequently, all such modifications and variations are included within the scope of the invention as defined herein.

BRIEF DESCRIPTION OF DRAWING FIGURE

FIG. 1 depicts a flow chart of a favored mode of the system herein.

DETAILED DESCRIPTION OF THE PREFERRED EMBODIMENTS OF THE INVENTION

Referring now to FIG. 1 which is a graphic depiction of the flow of the system herein for social networking which includes facial matching for similarity to other members of the social networking site, or members of third party social networking sites who have provided photos and opted in for such.

In the first step for subscribers to the site, the user will visit the website of the provider of the service 12. On the initial visit, subscribers will be given menu driven software screen to provide profile information 14 related to themselves. Such information can include but is not limited to one or a combination of their name, and/or birth date, and/or password, and to augment the eventual facial similarity matching, their hair color, skin color, and eye color may be provided.

Upon finishing registration through the input of the profile information 14, the subscriber may then be provided with an input screen 15 by the server of the provider, where they are able to designate a digital file for uploading their digital photo 16 to the server. Concurrently the input screen 15 may display tips for the best photo format to yield the best matching results. Insuring a commonality of composition of the uploaded facial shot digital photo 16 of subscribers, aids the software in discerning facial profiles 17 and facial profile matches 18 to other subscribers.

Software running on the computer communicating through the providers server will examine the uploaded digital photo 16 for clarity and proper format 20 and to discern if one or a plurality of individual faces is present. The software also in a preferred mode of the system, changes a color digital photo 16 to a grayscale image 22 for the software's discerning of profile matches 18 between the subscribers. However this may also be a user option if the subscriber may want to see the matching differences between a color and grayscale photo comparison however experimentation has shown that changing of the digital photo 16 to a grayscale from color provides the best facial matching and such is the current preferred mode of the system.

If the digital photo 16 is of a group of people, or has a lot of surrounding objects to the image of the subscriber, the subscribing user may at this point be given the option to designate themself from the group 23 and/or various objects on their uploaded facial digital photo 16 by placing a targeting cursor thereon and depressing a key 24.

The software adapted to examining digital photos 16 and comparing various designated points 27 thereon is generally adapted to be able to discern the required designated points 27 on the digital photo 16 to construct a facial profile 17 based on the spacing and other relationships of the designated points 27 to each other. Alternatively, the subscribing user may be given the chance to employ a targeting cursor to mark the designated points 27 upon their uploaded and displayed digital photo 16. Such designated points 27 requested and provided by the subscriber can include one or a combination of a group of facial points on any digital photo 16 which may be relationally compared by software adapted to the task of facial recognition and comparison. Such designated points 27 include one or a combination of, the center of each eye, the tip of the nose, points defining the length and curve of the eyebrows, points designating the position, length, and curve of the lips, the center of the chin, the cheeks, points on each ear, and other points on the subscriber's face shown by the digital photo 16. The designated points 27, whether discerned by the software, or the subscriber, or using both sets of designated points 27, may then be employed by the software running on the computer to define a facial profile 17 of each individual user based on the relationship of the designated points 27. Other criteria such as the personal information entered on registration may also be employed in defining a facial profile 17. The software-derived facial profile 17, is employed to match the inputting subscriber to other subscribers with such facial profiles 17 already discerned and stored in memory.

Of course those skilled in the art, will no doubt realize that numerous ways are commercially available to render a facial profile 17 based on a digital photo 16, and, that technology, software, and computers, are ever evolving and therefor developing new ways to discern a facial profile 17 by sheer number crunching. Consequently all such current and future means to examine a digital photo 16 of a face and generate a facial profile 17 for comparison to other facial profiles 17 as would occur to those skilled in the art are anticipated within the scope of this patent. Currently the changing of the digital photo to grayscale, and subsequent discerning of a plurality of designated points 27, and requesting the subscriber to review the software chosen plurality before generating the matched group shown in the collage 31, is the preferred mode of operation. Additionally preferred is generating two sets of designated points 27 with one software generated and the other subscriber generated and thereafter employing both designated points 27 sets combined from a grayscale version of the digital photo 16, along with the subscribe designation of matches, to arrive at the matched group defined by a collage 31.

Subsequent to uploading their images, subscribers wait while software adapted to the task performs a facial profile comparison 26 using the one or both of the software and subscriber designated points 27 sets to generate their facial profiles 17 and compare it to facial profiles 17 of other subscribers stored in a database of such subscribers are compared. As noted in the preferred mode, the software can change the photos from color to grayscale which has been found to yield more accurate results in the subjective world of facial similarities. In addition to the designated points 27, the subscriber profile information 14, as to their physical appearance, may also be employed by the software comparing the facial profiles 17 since the text input does provide clues as to eye color, hair color, and other physical attributes which may augment the facial profile 17 developed from ascertaining the designated points 27 in the pixels of the uploaded digital photo 16. This combination analysis using the geometric relation of the designated points 27 to each other, and if employed the profile information 14, is employed by the software to ascertain matches to the subscriber digital photo 16 from amongst the stored facial profiles 17.

From the computer discerned matches, the subscribing user then may be given a screen wherein they may choose between a software adapted photo of themself 27 and their original photo 29 as to which is used by the software on the server to form a collage 31 using the online subscriber and other subscriber faces deemed similar, for display on their social network homepage. If employed, the subscriber designates in this step, which photo of themself will be combined with the ascertained similar subscriber photos, in forming the digital photo collage 31 generated by the software and which is placed by the software on the software generated home page for each subscriber.

As noted, in another preferred but optional step, subsequent to the software derived profile comparison 26, and generation of matches to the online subscriber, the software adapted to the task provides to the subscriber, on their computer screen, photos of a plurality of other subscribers 30 to the social network site, or a third party social network site which provides access to their subscriber's pictures. The subscriber is then offered the step of designating 33, from the provided images of computer image matched subscribers 30, which are closest to their own image. This designating 33 step by the online subscriber provides the subscriber a means to influence the eventual outcome of the comparison of facial profiles 17. This designating 33 step may be employed over time, and in subsequent comparisons by the software adapted to the task of matching. Using the subscriber's input in the designating 33 step, the software may rate the characteristics of the facial profiles 17 chosen by the subscriber as similar, as a factor in the subsequent outcomes. This choice of similarity by the subscriber using their own view of the initial results, can have a large effect during subsequent searches as the software can save the facial attributes 17 and other attributes such as the user-input during registration of the images the online subscriber felt were closest, and apply those attributes as a factor or multiplier in seeking matches in subsequent searches.

At this point in the process, another page is generated on the subscriber's display by software on the server. In this step, the subscriber may be given an option to choose a collage 40 for display on their home page from a plurality of software-generated collages 40, each featuring the subscriber, and faces the subscriber selected as their closest look-alikes in the previous step. The user may choose one of the plurality of collages 40 and the final collage 41 is generated. This final collage 41 is communicated to the subscriber and may be hot-linked by html with the subscriber's homepage and used on their other social networking pages such as MySpace or Facebook.

At this point in the system, a permission stage 44 occurs and the user can make a choice of whether or not they would like to interact with the other determined look-alikes defined in the final collage 41. They can email their look-alikes, post a comment on their wall, or view any information they have posted on their profile.

The subscriber's presence in the final collage 41 can act as a pass to interact with the other members pictured in the final collage 41. Members in the final collage 41 and future discerned "look-alike" subscribers may be saved in the subscriber's profile and act as keys to allow communication.

Assuming the subscriber and the other members of the final collage 41 and other look-alike subscribers opt-in for communication, then the software will allow communication between the various parties.

The system operates to achieve matches between facial profiles 17 on an ongoing basis since people are added to the database perpetually. This allows the previously registered subscribers and ongoing new subscribers, to get an update of possibly newer and better matches. As noted, this ongoing search can be greatly effected by the subscribers designating 33 step which was input as to what are the closest matches to themselves.

Upon an initial match determination or future match, a subscriber who has been a member will receive an email stating a new member subscriber has registered and a match occurred with a message such as, "Someone that looks like you has just registered on www.twinish.com! Of course the subsequent subscriber's designating 33 step, when input, will effect the match to earlier and subsequent users.

By continually searching for, and adding new matches, and employing the input by subscribing users as to characteristics they consider matching in the first group of digital photos 16 provided in a search, the results more closely resemble the subscribing user. As new subscribers are added, or if large social networking sites like FACEBOOK allow their members to provide digital photos 16 for a comparison, the providing server will continue to grow exponentially in a process that is perpetual.

While all of the fundamental characteristics and features of the disclosed method and apparatus for encouraging social networking using a facial comparison and matching feature, with reference to particular embodiments thereof, have been shown and described, a latitude of modification, various changes and substitutions are intended in the foregoing disclosure and it will be apparent that in some instance, some features of the invention will be employed without a corresponding use of other features, or steps may be rearranged for operations, without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. A method for matching digital facial images of subscribers to a social network, to current and newly acquired facial images of other persons comprising the steps of:

providing a network accessible website operating with software running on a server enabling communication with current subscribers and potential users of said social network;

employing said software configured for providing an input webpage displayable on a video display of a user computing device, for said potential users to input user information and register as respective subscribers to said social network;

employing said software configured for allowing said subscribers to upload facial digital images to a computer database operating on a computer server for said social network with each respective said facial digital image uploaded to said database, correlating to the face of a respective said subscriber uploading it;

employing said software, which is configured to communicate said facial digital image of each respective said subscriber, to a said subscriber for display upon said video display of said subscriber, along with instructions for said subscriber to employ a cursor positionable by said subscriber upon said video display, and to use an input key of said user computing device, to designate a plurality of individual positions upon said facial digital image, for use as points of comparison upon said respective facial digital image of said subscriber, and employing said software to instruct each subsequent respective said subscriber, to employ said cursor and said input key, to respectively designate the same respective plurality of individual positions upon each respective facial digital image, as points of comparison upon each respective said facial digital image;

employing said software, based upon respective spacing of said points of comparison, located upon each respective facial digital image as, to generate a respective facial profile for each said facial digital image of each said subscriber;

employing said software which is configured for storing of said facial profiles in a database including all said facial profiles, in electronic memory accessible to said computer and in an association where each respective said facial profile correlates to a respective said facial digital image provided by respective subscriber;

employing said software, upon an input command from a said computing device of an inquiring subscriber, configured to perform a comparison of a said facial profile correlating to the respective individual said facial digital image of an individual said inquiring subscriber, said facial profiles in said database of facial profiles, to thereby ascertain one or a plurality of matching facial profiles which each said matching facial profile correlating to a respective matching facial digital image of other said subscribers;

subsequent to said comparison, employing said software configured to communicate to said computing device of said inquiring subscriber said matching facial digital images;

employing said software which is configured to provide said inquiring subscriber with a video page displayable on said video display of said inquiring subscribe for allowing said inquiring subscriber to designate and communicate to said server a selection from said matching facial digital images chosen by said inquiring subscriber as a close match to their own respective said facial digital image, said matching facial digital images chosen and communicated, forming a matched group of said facial digital images;

employing said software running on said server which is configured to employ said selection from said matching facial digital images said matched group of images, and a respective said individual said facial digital image correlated to said inquiring subscriber to generate a collage image which includes in a single digital image, said facial digital image correlating to said inquiring subscriber and said matching facial digital images; and subsequent to generating said collage image, employing said software which is configured to communicate said collage image to said computing device of said inquiring subscribe for display on a webpage.

2. The method of claim 1 also including:

using said software which is configured to change said facial digital images uploaded to said server from color facial digital images to grayscale facial digital images before designating said points of comparison.

3. The method of claim 2 also including:

employing said software which is configured to communicate a provided display viewable upon said computing device of said subscriber allowing individual said subscribers to employ a targeting cursor upon said provided display of their own facial digital image, to thereby designate and communicate at least some of said points of comparison upon their own said digital facial image.

4. The method of claim 3 also including:

applying a mathematical score to each of said selection from said plurality of matching facial digital images;

employing said mathematical score as a determining factor in any future determination of said matching facial digital images.

5. The method of claim 3 also including:

allowing other subscribers to other social networking web sites to upload said facial digital images to said database; and allowing individual of said other subscribers to interface with said server as said inquiring subscriber.

6. The method of claim 3 also including:

providing said inquiring subscriber contact information for each subscriber having a said facial digital image in said matched group of images.

7. The method of claim 2 also including:

applying a mathematical score to each of said selection from said plurality of matching facial digital images;

employing said mathematical score as a determining factor in any future determination of said matching facial digital images.

8. The method of claim 2 also including:

allowing other subscribers to other social networking web sites to upload said facial digital images to said database; and allowing individual of said other subscribers to interface with said server as said inquiring subscriber.

9. The method of claim 2 also including:

providing said inquiring subscriber contact information for each subscriber having a said facial digital image in said matched group of images.

10. The method of claim 2 also including:

for said plurality of individual positions upon said facial digital image, employing one or a combination of points from a group of facial image points, including, a point at the center of each eye, a point at the tip of the nose, points defining the length and curve of the eyebrows, points designating the position, length, and curve of the lips, a point at the center of the chin, a point at the center of the cheeks, individual points on each ear.

11. The method of claim 1 also including:

using said software which is configured to communicate a provided display viewable upon said computing device of said subscriber allowing individual said subscribers to employ a targeting cursor upon said provided display of their own facial digital image, to thereby designate and communicate at least some of said points of comparison upon their own said facial digital image.

12. The method of claim 11 also including:

applying a mathematical score to each of said selection from said plurality of matching facial digital images;

employing said mathematical score as a determining factor in any future determination of said matching facial digital images.

13. The method of claim 11 also including:
allowing other subscribers to other social networking web sites to upload said facial digital images to said database; and
allowing individual of said other subscribers to interface with said server as said inquiring subscriber.

14. The method of claim 11 also including:
providing said inquiring subscriber contact information for each subscriber having a said facial digital image in said matched group of images.

15. The method of claim 1 also including:
applying a mathematical score to each of said selection from said plurality of matching facial digital images;
employing said mathematical score as a determining factor in any future determination of said matching facial digital images.

16. The method of claim 15 also including:
allowing other subscribers to other social networking web sites to upload said facial digital images to said database; and
allowing individual of said other subscribers to interface with said server as said inquiring subscriber.

17. The method of claim 1 also including:
allowing other subscribers to other social networking web sites to upload said facial digital images to said database; and
allowing individual of said other subscribers to interface with said server as said inquiring subscriber.

18. The method of claim 17 also including:
providing said inquiring subscriber contact information for each subscriber having a said facial digital image in said matched group of images.

19. The method of claim 1 also including:
providing said inquiring subscriber contact information for each subscriber having a said facial digital image in said matched group of images.

20. The method of claim 1 also including:
for said plurality of individual positions upon said facial digital image, employing one or a combination of points from a group of facial image points, including, a point at the center of each eye, a point at the tip of the nose, points defining the length and curve of the eyebrows, points designating the position, length, and curve of the lips, a point at the center of the chin, a point at the center of the cheeks, individual points on each ear.

* * * * *